Patented Dec. 30, 1930

1,786,989

UNITED STATES PATENT OFFICE

HENRY A. GARDNER AND CALVIN A. KNAUSS, OF WASHINGTON, DISTRICT OF COLUMBIA, ASSIGNORS TO HENRY A. GARDNER LABORATORY, INC., OF WASHINGTON, DISTRICT OF COLUMBIA, A CORPORATION OF THE DISTRICT OF COLUMBIA

PROCESS FOR ACETYLATION OF NITROCELLULOSE

No Drawing.   Application filed January 12, 1928. Serial No. 246,371.

This invention relates to a process for the production of acetyl-nitro-cellulose, with recovery of excess reagents, said process utilizing ethylene chlorid as a precipitating or separating reagent.

It is known that cellulose nitrate has certain inherent faults as an ingredient of compositions for producing films, coatings and the like, one of which is its high degree of flammability. While cellulose acetate is known to be markedly less flammable than is cellulose nitrate, only relatively small quantities thereof ordinarily can be incorporated into a readily flowable solution, i. e., usually not in an amount greater than about 8 per cent of the weight of the solution. When a coating of such a cellulose acetate solution is applied to a surface, and the solvent allowed to evaporate, the resulting film is extremely thin and has not a desirable degree of durability. Another inherent fault of cellulose acetate as a film-former is its poor solubility in such high-boiling-point, "blush-preventative" solvents as butyl acetate and amyl acetate. Apparently the best solvent for, and the one usually employed with cellulose acetate is acetone. Because of the rapid rate of evaporation of the latter, the film resulting from a coating of a solution of cellulose acetate in acetone is rather porous in structure and possesses an undesirable whiteness, due probably to precipitation of moisture in the film caused by the lowering of the dew point of the surrounding atmosphere. By merely mixing together about equal parts by weight of cellulose nitrate and cellulose acetate and producing a film-forming composition from the mixture, the above-mentioned shortcomings are not overcome; solution of the mixture requires a relatively large volume of acetone-like solvent and the resulting solution is extremely viscous and still possesses a flammability of the order of cellulose nitrate alone. A mere mixture of the two cellulose compounds apparently is obtained,—not a molecular union.

We have discovered that film-forming compositions combining the desirable characteristics of cellulose nitrate and of cellulose acetate and substantially free from the above mentioned undesirable characteristics may be prepared from a compound cellulose ester wherein are molecularly united to cellulose at least one acetate group and at least one nitrate group; that is, an acetyl-nitro-cellulose compound. It has been found that acetyl-nitro-cellulose is soluble not only in acetone but also in all or most of the other known organic solvents for similar compounds including butyl acetate, ethers of ethylene glycol, ethyl acetate, and the like or mixtures thereof, and that the resulting solutions possess a desirable viscosity and leave films which are substantially no more readily flammable than are those of cellulose acetate itself.

An acetyl-nitro-cellulose product may, for example, be produced by the simultaneous treatment of cellulose with suitable nitrating and acetylating agents; e. g., with the required amount of an acid mixture including nitric, sulfuric and acetic acids and acetic acid anhydride. Another operable method,—which method we believe to be particularly advantageous,—comprises treating a material consisting of a nitro-cellulose having one or more unsubstituted hydroxyl groups in the molecule and containing approximately 11 per cent of combined nitrogen, with an acetylating agent, whereby to replace the hydroxyl group or groups with an acetyl group or groups, thereby forming a combined ester, acetyl-nitro-cellulose. The following formulæ probably are representative of the acetyl-nitro-cellulose products obtainable:

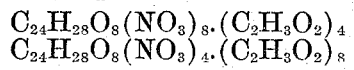

The combined ester may contain approximately from 9.6 per cent to 4.8 per cent of nitrogen and acetyl residues equivalent to from 20.6 per cent to 41.2 per cent of acetic acid. The material formed in the manner just described is directly soluble in acetone, and in acetone and butyl acetate or ethers of ethylene glycol or ethyl acetate or the like commonly-used solvents.

In acetylating nitro-cellulose, as well as in acetylating cellulose, the use of an excess of acetylating reagent is practically necessary and the cost of this excess adds materially to the expense of the acetylating process if it be not recovered. Where the reaction mixture is treated with water at the completion of the acetylation, the excess of acetylating reagent (acetic anhydride or acetyl chlorid) is converted into weak acetic acid. This conversion represents a loss of a valuable reagent. We have found that ethylene dichlorid ($C_2H_4Cl_2$) can be used for precipitation of acetyl nitro-cellulose and of acetyl cellulose at the end of the reaction. It takes up, but does not hydrate, the excess of acetylating reagent; and this acetylating reagent can afterwards be separated and recovered unchanged by simple fractional distillation.

A characteristic of our new acetyl-nitrocellulose products is that when they are placed upon a glass plate and touched with a lighted match they will resist burning or at least burn slowly without flashing, their flammability varying directly with their nitrogen content, and during the burning process will melt and form a block charred mass. Ordinary cellulose nitrate under similar conditions will flash immediately and leave no ash. Our products approximate cellulose acetate in resistance to burning.

The following is a specific example illustrative of one method of producing the type of acetyl-nitro-cellulose product described:

Into a mixture comprising 75 grams of acetic acid anhydride, 75 grams of acetic acid, 2 cubic centimeters of concentrated sulfuric acid (monohydrate) and 500 grams of an organic liquid such as ethylene dichloride which is miscible with the other reagents employed, there is slowly added 100 grams of commercial nitro-cellulose. The mixture is warmed to a temperature of approximately 50° C. for a period of about two hours, when, with the proportions given, the mass shows a rather gelatinous consistency due probably to the partial solution of the reaction product in the acetic acid content of the mixture. The acetic acid content increases as the reaction progresses, due to the fact that part of the anhydride used takes up OH from the hydroxylated nitro-cellulose molecule to form acetic acid. After allowing the mass to stand for an additional period of time, say 3 to 4 hours, there are added thereto about 500 grams of ethylene dichloride, with the result that the dissolved material is precipitated and a flocculent product obtained. The said flocculent product,—consisting essentially of acetyl-nitro-cellulose,—is then filter-pressed, the solvent evaporated from the press cake by drying, and the press cake washed thoroughly with water to remove any traces of acid and then re-dried.

Another practical method of preparing a batch of the said acetyl-nitro-cellulose product comprises: mixing 100 grams of acetic acid anhydride, 200 grams of acetic acid and about 3 ccm. of sulfuric acid (98 per cent); slowly adding to the resulting mixture, in small portions, 100 grams of commercial nitro-cellulose, being careful to control the reaction (which is apt to be violent in nature) by maintaining as low a temperature as is possible by surrounding the reaction vessel with ice; cooling the reaction mixture after the conclusion of the first, or violent, stage of the reaction; removing the reaction vessel from ice and thereafter maintaining the reaction mixture at about room temperature for about 18 hours, during which period the cold reaction is concluded; pouring the resulting clear solution of reaction product into about 500 ccm. of ethylene dichloride whereby a flocculent precipitate consisting essentially of acetyl-nitro-cellulose is thrown out of solution; filter-pressing and subsequently drying the precipitate; washing the filter-pressed and dried precipitate with water, and finally drying the washed precipitate.

In the foregoing example the quantity of acetic anhydride may be varied from say 75 to 150 grams with the production of products of correspondingly varying acetyl content.

Attention is called to the fact that the acetyl-nitro-cellulose product can be precipitated out of solution by other means than by association of the reaction mixture with ethylene dichloride as hereinbefore mentioned; for example, the reaction mixture may be poured into a relatively large volume of water. However, by the latter procedure one effects an undesirable dilution of the acetic acid content of the reaction mixture with a consequent loss,—or necessity of costly recovery,—of the acetic acid from the dilute aqueous solution. The practicing of our new procedure makes possible the ready recovery of the acetic acid content of the reaction mixture, by fractional distillation of the acetic acid from the solution thereof in ethylene dichloride, after separation of the precipitate. Thus, for instance, after pouring the reaction mixture containing acetic acid and acetic acid anhydride into ethylene dichloride, and separating out the resulting percipitate, the acetic acid anhydride content of the filtrate may be separated by appropriate cooling, and the acetic acid may be separated from the ethylene dichloride by fractional distillation, acetic acid boiling at 117–118° C., and ethylene dichloride boiling at 83–84.5° C. This procedure, i. e., the use of ethylene dichloride as a precipitant for acetylated nitro-cellulose,—has been found to be equally applicable in the separation of acetyl-celluloses generally from acetic acid.

The compound cellulose ester obtained by practicing either of the above, or an equivalent, procedure, may be converted into a film-forming composition (e. g., lacquer) in the following manner: 25 parts by weight of the said compound cellulose ester are thoroughly dissolved, with stirring, in 25 parts by weight of butyl acetate, 25 parts by weight of ethyl acetate, and 25 parts by weight of acetone. After solution is effected, there may be added, if desired, about 50 parts by weight of a liquid hydrocarbon such as toluene, about 50 parts by weight of a 50 per cent solution of rosin or other resin in toluene, and about 5 parts by weight of a plasticizer such as, for example, castor oil or a high boiling ester. The resulting clear solution may be pigmented, if so desired, by milling with dry pigments, or by thorough admixture with pastes of pigment ground in suitable oils, plasticizers, or resin solutions.

It is to be understood that the acetyl-nitrocellulose product herein described may be incorporated into solutions adapted for uses other than lacquers, such as for example, photographic film-forming compositions, and the like.

To further illustrate the invention the following is noted: When 5 grams of ordinary nitro-cellulose are dissolved in 100 grams of acetone, the resulting solution has a vicosity of "Q" (i. e., 4.35 poises, absolute viscosity) on the Gardner-Holdt viscosity scale (the viscosity-measuring apparatus described in "Paint, Varnish, Lacquers and Colors", H. A. Gardner, 4th ed., and in United States "Federal Specification for Spar Varnish"). When 20 grams of the low viscosity commercial cellulose nitrate now used in lacquers are dissolved in 100 grams of acetone, the resulting solution has a viscosity of about "Q" (i. e., 4.35 poises, absolute viscosity) on the Gardner-Holdt viscosity scale. When as high as 25 grams of the acetyl nitro-cellulose product prepared according to either of the specific procedures hereinbefore described is dissolved in 100 grams of acetone, the solution has a viscosity of about "Q" (i. e., 4.35 poises, absolute viscosity) on the Gardner-Holdt scale. This comparison evidences the facts that film-forming compositions of the desirable viscosity may be prepared containing relatively high percentages of our acetyl-nitro-cellulose product, and that the films produced therefrom are relatively rich in the film-forming constituent, thus providing a film or coating having great durability. Moreover, the physical properties of films of our composition have been found to be generally superior to those of films from cellulose acetate or nitrate including the low viscosity commercial cellulose nitrate now commonly used in lacquers.

We claim:

1. Process which comprises adding ethylene dichloride to a solution of acetylated nitrocellulose in a solvent comprising acetic acid, and separating the resulting precipitated acetylated nitrocellulose, then after separating said precipitate, fractionally distilling the remaining solution to separate the acetic acid from the ethylene dichloride.

2. In processes for the production of acetylated nitrocellulose involving reacting the nitrocellulose with an acidic acetylating agent containing acetic acid and acetic acid anhydride, the step which consists in treating the resulting reaction mixture with ethylene dichloride.

3. In processes for the acetylation of nitrocellulose involving reacting the nitrocellulose with an acidic acetylating agent containing acetic acid and acetic acid anhydride, the steps which consist in reacting the nitrocelluose with the acidic mixture in the presence of ethylene dichloride and subsequently precipitating the resulting acetylated nitrocellulose from the reaction mixture by admixture with ethylene dichloride.

4. Process which comprises adding ethylene dichloride to a solution of acetylated nitro-cellulose in a solvent comprising acetic acid, and separating the resulting precipitated acetylated nitro-cellulose.

5. Process which comprises reacting nitro-cellulose with an acidic acetylating agent containing acetic acid and acetic acid anhydride and thereafter treating the reaction mixture with ethylene dichloride, and separating the resulting precipitated acetylated nitro-cellulose.

6. Process which comprises reacting nitro-cellulose with an acidic acetylating agent containing acetic acid and acetic acid anhydride in the presence of ethylene dichloride at a temperature not substantially in excess of 50° C., and thereafter treating the reaction mixture with ethylene dichloride, and separating the resulting precipitate.

7. Process which comprises slowly adding 100 grams of commercial nitro-cellulose to a mixture comprising about 75 grams of acetic acid anhydride, about 75 grams of acetic acid, and about 2 ccm. of sulfuric acid in the presence of about 500 grams of ethylene dichloride, at normal room temperature, thereafter maintaining the reaction mixture at about 50° C. for about 2 hours, concluding the reaction at normal room temperature, treating the reaction mixture with about 500 grams of ethylene dichloride, and separating the resulting flocculent precipitate.

In testimony whereof, we affix our signatures.

HENRY A. GARDNER.
CALVIN A. KNAUSS.